United States Patent [19]

Poivet et al.

[11] Patent Number: 5,255,098
[45] Date of Patent: Oct. 19, 1993

[54] PROCESS FOR THE INSERTION OF A SUPPLEMENTARY VIDEO INFORMATION SET OUTSIDE A MAIN IMAGE

[75] Inventors: Michel Poivet; Laurent Perdrieau, both of Illkirch, France

[73] Assignee: Laboratoire Europeen de Recherches Electroniques Avancees, Courbevoie, France

[21] Appl. No.: 893,655

[22] Filed: Jun. 4, 1992

Related U.S. Application Data

[63] Continuation of Ser. No. 570,143, Aug. 20, 1990, abandoned.

[30] Foreign Application Priority Data

Aug. 23, 1989 [FR] France .................... 89 11166

[51] Int. Cl.$^5$ .................. H04N 7/01; H04N 7/00; H04N 5/46
[52] U.S. Cl. .................... 358/183; 358/140; 358/142; 358/180
[58] Field of Search .............. 358/183, 22 PIP, 142, 358/141, 11, 12, 140, 180, 22, 147

[56] References Cited

U.S. PATENT DOCUMENTS

| | | | |
|---|---|---|---|
| 4,551,754 | 11/1985 | Meise et al. | 358/180 |
| 4,612,573 | 9/1986 | Grallert et al. | 358/140 |
| 5,134,479 | 7/1992 | Ohishi | 358/140 |
| 5,146,335 | 9/1992 | Kim et al. | 358/183 |
| 5,159,438 | 10/1992 | Rabii | 358/12 |

FOREIGN PATENT DOCUMENTS

| | | |
|---|---|---|
| 61-214872 | 9/1986 | Japan . |
| 62-213389 | 9/1987 | Japan . |
| 63-146672 | 6/1988 | Japan . |
| 1-273489 | 11/1989 | Japan . |
| 3-159385 | 7/1991 | Japan . |

*Primary Examiner*—James J. Groody
*Assistant Examiner*—Safet Metjahic
*Attorney, Agent, or Firm*—Roland Plottel

[57] ABSTRACT

A method for displaying a supplementary video image outside a main image. For example, the main image has a 4/3 aspect ratio and the tube has a 16/9 aspect ratio. The method includes steps of processing a supplementary video image at the time of the line return of the main image to provide a video signal of the desired format. Then, multiplexing the components of the main video signal with the components of the supplementary video signal; and then separately processing the components of the multiplexed signal to produce the components of the display signal for a display on the tube. The displayed image has the main 4/3 aspect ratio image in 4/3 aspect ratio occupying approximately 12/9 of the screen and supplementary video images occupying the remaining 4/9 of the screen.

10 Claims, 2 Drawing Sheets

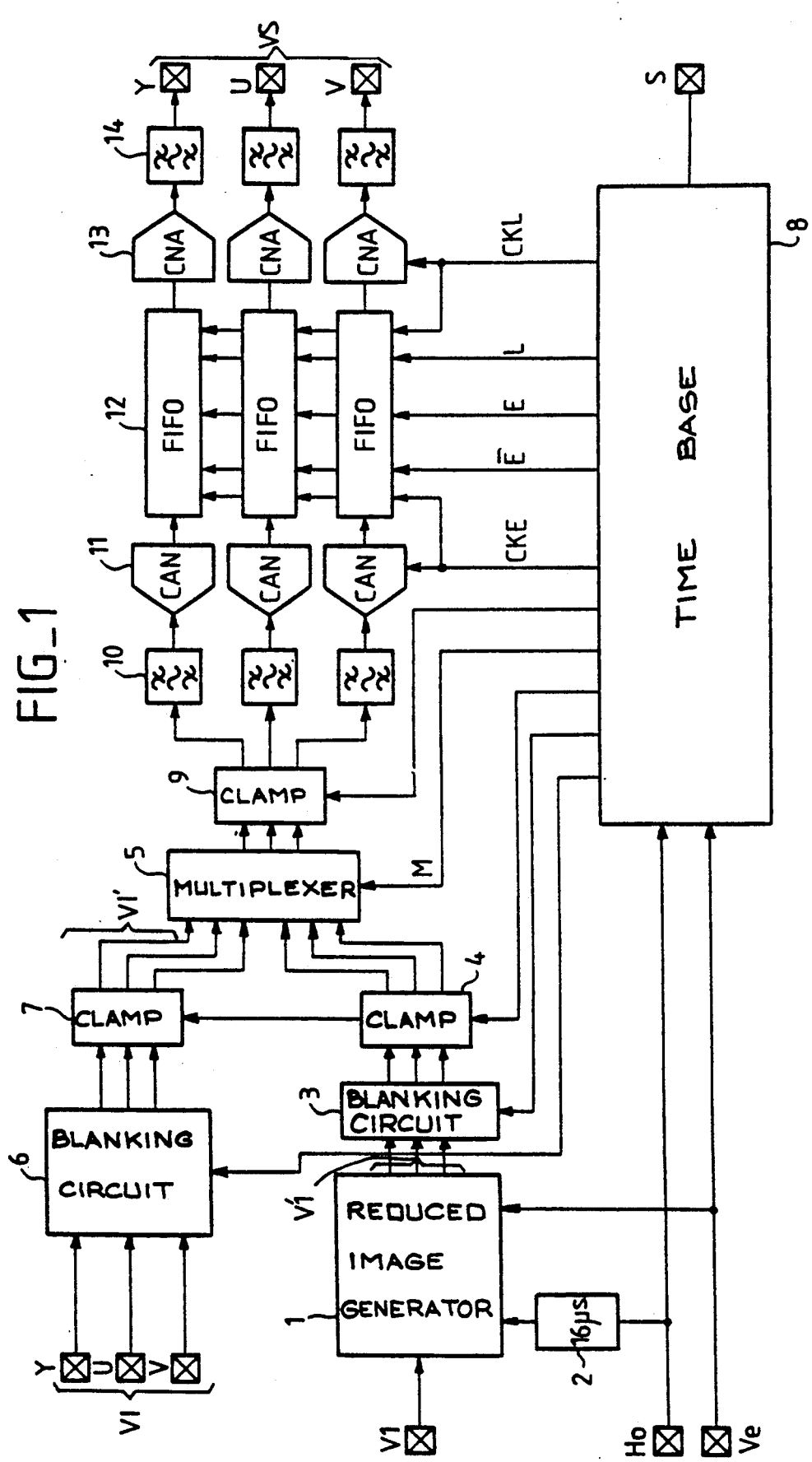

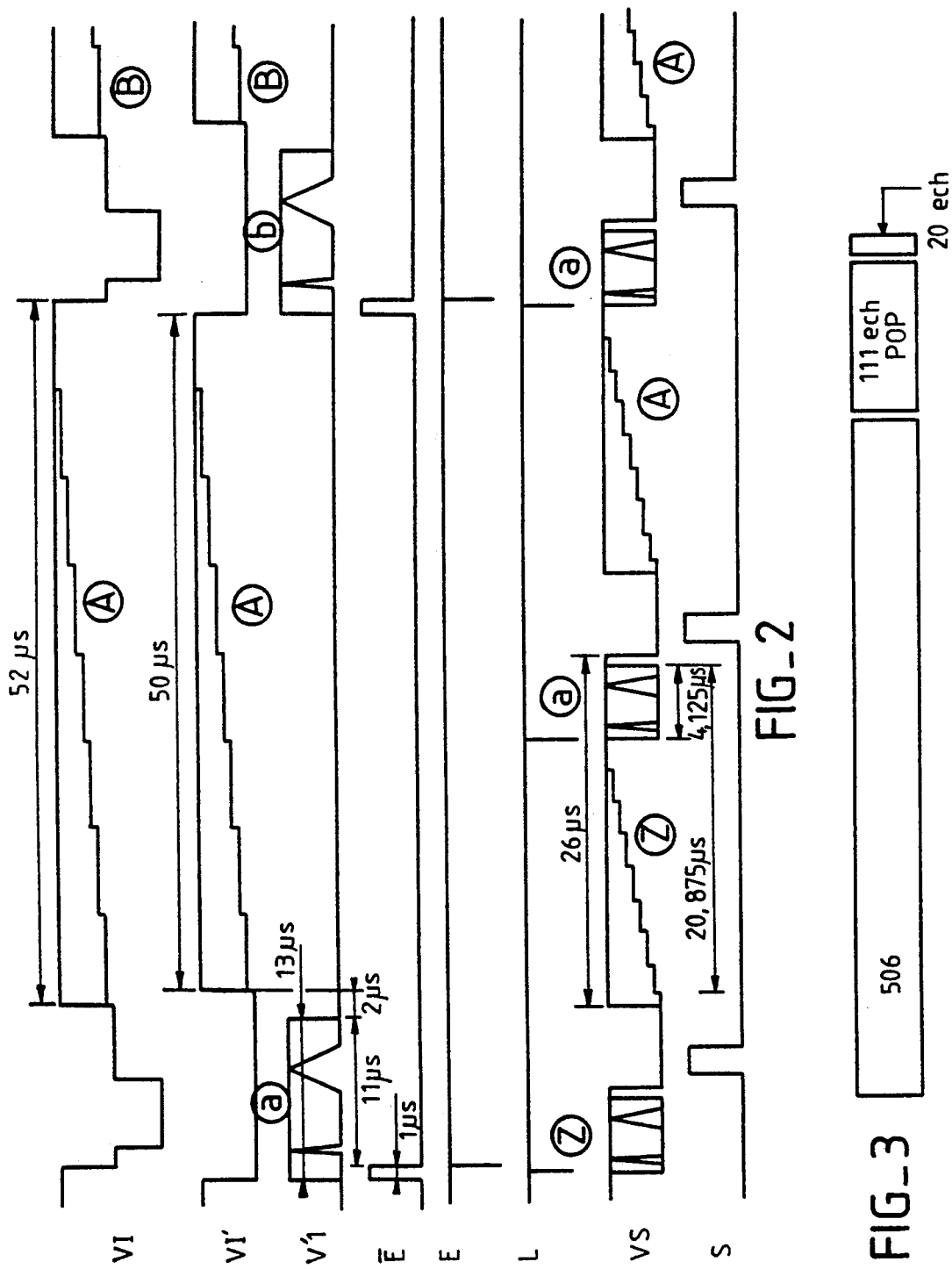

PROCESS FOR THE INSERTION OF A SUPPLEMENTARY VIDEO INFORMATION SET OUTSIDE A MAIN IMAGE

This application is a continuation of application Ser. No. 570,143, filed Aug. 20, 1990, now abandoned.

BACKGROUND OF THE INVENTION

1. Field of the invention

The present invention relates to a process for the insertion of a supplementary video information set outside a main image of 4/3 format on a television tube of 16/9 format.

2. Description of the prior art

Since a short time ago, image tubes of 16/9 format have been available on the market. These tubes were developed with a view to high-definition applications. Thus, it is possible to envisage with immediate effect the equipping of television receivers with this type of tube, especially television receivers the architecture of which has been constructed so as to be compatible with future standards. Nevertheless, all currently transmitted programs are transmitted in 4/3 format. Thus, in order to be able to display a video image of 4/3 format on a 16/9 tube it is necessary to process this image in order to eliminate the problems of distortion or anamorphosis in the course of the display. Various processings may be envisaged. Thus, in the case of an image of "cinemascope" type it is possible to envisage the enlarging of the image vertically in such a manner as to reduce the black bands. On the other hand, if the image is displayed while maintaining the initial format, a part of the screen is left free.

SUMMARY OF THE INVENTION

Accordingly, the object of the present invention is to provide a novel process for the insertion of a supplementary video information set which utilizes the part left free on the screen in the course of the display of a main video image of 4/3 format.

Consequently, the subject of the present invention is a process for the insertion of a supplementary video information set outside a main image of 4/3 format on a tube of 16/9 format, which process consists, before processing the main image for display, in inserting the supplementary information set in the line return of the main image.

According to a particular embodiment, the process comprises the following steps:
 processing of the supplementary video information set to obtain, at the instant of the line return of the main image, a video signal of the desired format;
 multiplexing of the components of the main video signal with the components of the supplementary video signal, and
 separate processing of the components of the multiplexed signal to obtain the components of a display signal for a display on a tube of 16/9 format.

In the present invention, the expression "supplementary video information set" is understood to refer to either an image of the reduced format of the same type as that obtained in the known picture-in-picture processes or a specific information set such as an information set concerning the functioning of the television receiver. In the case of a reduced image, the supplementary video information set is obtained by utilizing a processing circuit of conventional type and the combination consisting of the supplementary video information set and the main video information set is processed in the same manner for display on a 16/9 tube.

On the other hand, in order to be able to insert the supplementary information set easily during the time required for the scanning of a line, namely in conformity with the standard, before performing the multiplexing, the active line part of the components of the main video signal is normalized over a duration less than the theoretical duration. Likewise, when the supplementary video information set is constituted by a supplementary video signal emerging from a picture-in-picture image generator of conventional type, the supplementary video signal is normalized over a duration of 11 $\mu$s. Furthermore, the components of the video signal and of the supplementary video signal are matched to the same level, namely to the same black level.

In fact, in order to permit the display of the multiplexed video signal on a tube of 16/9 format, it is necessary to process said signal by performing, in particular, a compression of the image and possibly a multiplication of the reading frequency in such a manner as to read the same line twice in succession. Thus, the processing of the multiplexed signal consists in storing each one of the components of the multiplexed signal in a line memory at a first sampling frequency, which is a function of the difference between the format of the main image and the display format, and in reading each one of the memories at a second sampling frequency. As a function of the current standard, the first sampling frequency or write frequency is equal to 10.125 MHz, while the second sampling frequency or read frequency is equal 13.5 MHz without line repetition.

BRIEF DESCRIPTION OF THE DRAWINGS

Further features and advantages of the present invention will emerge on reading the description given hereinbelow of an embodiment of a device utilizing the process referred to hereinabove, with reference to the accompanying drawings, in which:

FIG. 1 is a simplified general diagram of a device utilizing the process of the present invention;

FIG. 2 is a diagram of the times of the main signals utilized in the device of FIG. 1, and FIG. 3 is a diagram explaining the organization of a line memory utilized in the device of FIG. 1.

DESCRIPTION OF THE PREFERRED EMBODIMENT

As shown in FIG. 1, the device for the implementation of the process of the present invention is constituted, first of all, by a circuit generating a reduced image picture 1. This reduced image generator is formed by a circuit known to a person skilled in the art and utilized to reduce a secondary video signal in picture-in-picture devices of known type. Such a reduced image generator is designed around the circuit PIP 2250 produced by ITT, for example. This generator 1 receives at its input the supplementary video signal V1 which may be, for example, the video signal of another television station link or the video signal emanating from a video recorder. It also receives, as synchronization signals, the horizontal HO and vertical VE synchronization signals of the main video signal.

As shown in FIG. 1, the horizontal synchronization signal HO is delayed by means of the delay circuit 2. To obtain the supplementary video signal during the line return of the main video signal, the delay applied to the horizontal synchronization signal HO is approximately 16 μs. Conventionally, the generator 1 performs a compression according to a compression ratio 4 of the secondary video signal. The generator 1 processes the images on the conventional standard, namely 15.625/15.750 kHz, and reconstructs a reduced image under this same standard. What is thus obtained at the output of the generator 1 is a secondary video signal V'1 of a duration of 13 μs, as shown in FIG. 2. This signal V'1 is obtained during the successive times reference (a), (b), in FIG. 2.

As shown in FIG. 1, the components Y, U, V of the modulated supplementary video signal V'1 are passed to a blanking circuit 3 which performs the centering and the normalization of the supplementary video signal in such a manner as to take into account only the part centered on 11 μs. This circuit is controlled by a signal emanating from the time base 8 described hereinbelow. This signal is an active control signal having a duration of 11 μs which matches the supplementary video to the level of the black for the remainder of the time. The components at the output of the circuit 3 are passed to a "clamping" circuit 4 in such a manner as to match said components to one and the same black level. The circuit 4 is controlled by a signal emanating from the time base or clock generator 8 and constituted by a pulse of 3 μs situated outside the useful 13 μs of the supplementary video. The output components of the circuit 4 are passed to a multiplexer 5. On the other hand, the components Y, U, V of the modulated main video signal V1 are themselves also passed to a blanking circuit 6. In fact, according to the current standard, the line duration of the composite video signal is 64 μs. Nevertheless, the active line part has a duration of 52 μs, as shown in FIG. 2, 12 μs being intended for the line return. The purpose of the blanking circuit 6 is to normalize the active line part referenced (A) or (B) by centering it on a lesser duration. This duration is equal to 15 μs. This circuit is controlled by a control signal emanating from the time base 8, which is active for 50 μs and which matches the main video signal to the level of the black during the remaining 14 μs. In this case, 1 μs of video information is eliminated on each side. In fact, this is not harmful as regards the quality of the image displayed, since in general the video information sets contained at the ends of the video signal are not visible on the screen or contain a certain number of harmful disturbances which it is preferable to eliminate. Likewise, the components emanating from the circuit 6 are passed to a "clamping" circuit 7 to perform a matching of said components to one and the same black level. This circuit receives from the time base 8 a pulse of 4 μs situated during the line return of the main video. What is obtained at the output of the circuit 7 is a video signal as represented by V1' in FIG. 2. This video signal is passed to the input of the multiplexer 5. The multiplexer 5 is controlled by the signal M emanating from a time base 8 which will be described in greater detail hereinbelow. The control signal M passed to the multiplexer authorizes in the high state the passage of the supplementary video signal emanating from the circuit 4 to the digital processing. There are thus obtained at the output of the multiplexer the components of a composite video signal constituted respectively by the active line part of the main video signal during a duration of 50 μs and by the supplementary components of the video signal during 11 μs. The components of the video signal which emanate from the multiplexer 5 are matched to one and the same black level by means of a "clamping" circuit 9. This circuit receives from the time base 8 a pulse of 2 μs which is situated within the 2 μs of black written after the supplementary video. Following this, the three components Y, U, V emanating from the circuit 9 are processed in a digital circuit, in the embodiment shown, in such a manner as to output a video signal which can be displayed on a tube of 16/9 format without distortion.

As shown in FIG. 1, the processing circuit consists essentially of three circuits in parallel, each comprising a band pass filtering circuit 10, an analog-digital converter 11, a FIFO-type cell 12 consisting of write and read counters and a dynamic memory, an analog-digital converter 13 and a filtering circuit 14. The various circuits, such as the analog-digital converters 11, the cells 12 and the digital-analog converters 13, are controlled by clock signals emanating from the time base 8, especially the write clock CKE and the read clock CKL. This time base is formed by a gate array, which receives the synchronization signals HO and VE and supplies not only the signals mentioned hereinabove but also a synchronization signal at 32 kHz. On the other hand, the FIFO-type cells 12 consisting principally of dynamic line memories with counters receive a certain number of signals emanating from the time base 8 in such a manner as to perform correctly the writing and then the reading of the memories. In a practical embodiment, the cells 12 consist of circuits referenced NEC μ PD 41101. These signals consist principally of a signal Ē for inhibiting the FIFOs in write. This signal Ē consists of a 1 μs pulse as represented in FIG. 2. This pulse is passed between the main video signal (A) and the supplementary video signal represented by (b). The FIFOs also receive a write initialization pulse E which is emitted before the useful part of the supplementary video signal (a). Likewise, the FIFOs also receive a read initialization pulse L which is emitted every 32 μs. This read initialization pulse L reinitializes the read counter during the 1 μs pulse provided between the writing of the main image and that of the reduced image, as represented in FIG. 2 and as explained in greater detail hereinbelow. The processing circuit referred to hereinabove operates in the following manner. A write counter contained in the FIFOs is reinitialized before the writing of the first data item of the 11 μs of the supplementary video signal. Then, the black level of the main image is written during 2 μs. Following this, the memory is written with the main video signal during 50 μs and then a 1 μs pulse controlled by the signal Ē inhibits the writing in order to ensure a perfect resynchronization of the read and write operations. The reinitializing of the write counter is performed by the signal Ē. The storage in memory of the black level permits the maintenance of a maximum dynamic range for the analog-digital converter. The write sampling frequency is 10.125 MHz. This write frequency was chosen in order to perform a compression over the incident image in such a manner as to obtain a display of 16/9 format. In the embodiment represented, the line memories are then read at a frequency of 27 MHz. The components of the video signal are reconverted by the digital-analog converters 13 and are filtered at the output by the filtering circuits 14. What is thus obtained is an output video information signal VS as represented in FIG. 2. The difference between the write and read frequencies thus ensures a compression of the image in the horizontal direction of ¼ and thus suppresses any anamorphosis in the course of the display of a 4/3 image on a 16/9 tube. As the read frequency is greater than the write frequency, in order to avoid any overflow of the write counter due to the read counter, certain precautions must be taken. In particular, the write counter is initialized during the 1 μs write inhibition pulse provided between the writing of the main video signal and of the supplementary video signal. This permits a direct monitoring of the FIFO cells. However, the result of this is that, in the course of the reading, the content of the supplementary video signal is advanced by one line.

As shown in FIG. 2, the useful video signal thus has a duration of 26 μs and consists of a main video signal of 20.875 μs and a supplementary video signal of 4.125 μs, the supplement being formed by a black level signal. In the course of reading, these signals are read twice, as represented by the references ⓑⒶⓑⒶ.

An explanation will now be given of the constitution of the FIFO cells with reference to FIG. 3. As stated hereinabove, the FIFO cells consist of dynamic line memories associated with specific counters for the write and the read. The memories have a capacity of 910 samples. Nevertheless, 637 samples are written at each line. The last 273 samples were written during the field return. In fact, the FIFO cells are not reinitialized during the second line of each field, to permit the complete filling of the memory. In read, only 864 samples are read. As shown in FIG. 3, they are broken down into 506 samples for the main video image, 111 samples for the supplementary video signal or POP, and 20 samples for the black level. The remaining 227 samples originate from the black level written at field commencement and not rewritten on each occasion.

In the present case, a description has been given of the utilization of the process on 32 KHz television receivers with line repetition. Nevertheless, it is evident to a person skilled in the art that the process of the present invention may also be utilized with 15 kHz television receivers without line repetition. On the other hand, the process of the present invention has been implemented with a digital circuit. It is evident to a person skilled in the art that the processing to change the format of the image may also be performed by utilizing an analog circuit such as CCD (Charge Coupled Device) line memories.

What is claimed is:

1. A process comprising displaying a 4:3 aspect ratio picture forming a main image on a 16:9 tube screen, said 4:3 aspect ratio picture occupying a large fraction of the screen, and displaying additional 4:3 pictures constituted by supplementary video information set in the remaining unused portion of the 16:9 tube screen, which process consists, before processing a particular line of said main image for display, of inserting said supplementary information set during the line return interval preceding said particular line of said main image.

2. The process as claimed in claim 1, which comprises the following steps:
    processing of the supplementary video information set to obtain, at the instant of the line return of the main image, a video signal of a predetermined format;
    multiplexing components of a main video signal with the components of a supplementary video signal,
    and separate processing of the components of the multiplexed signal to obtain the components of a display signal for display thereof on a tube of 16/9 format.

3. The process as claimed in claim 2, wherein, before performing the multiplexing, the active line part of the components of the main video signal is normalized over a duration less than a predetermined duration, and then the normalized main video signal is set to a level and simultaneously the components of the supplementary video signal are normalized and set to a level.

4. The process as claimed in claim 3, wherein the active line part of the main video signal is normalized over a duration of 50 μs.

5. The process as claimed in claim 3, wherein the supplementary video signal is normalized over a duration of 11 μs.

6. The process as claimed in claim 2, wherein the processing of the multiplexed signal consists i storing each one of the components of the multiplexed signal in a line memory at a first sampling frequency, which is a function of the difference between the format of the main image and the display format, and in reading each one of the memories at a second sampling frequency.

7. The process as claimed in claim 6, wherein the first sampling frequency is equal to 10.125 MHz.

8. The process as claimed in claim 6, wherein the second sampling frequency is equal to 27 MHz in the case where the line is repeated.

9. The process as claimed in claim 6, wherein the second sampling frequency is equal to 13.5 MHz.

10. A method according to claim 1 further comprising a method of writing a line of the image into a data memory in the following sequence comprising initializing the memory, writing a first data item of the 11 μs of a supplementary video signal corresponding to said supplementary video information set, then writing a black level of the main image during the next 2 μs interval, then writing the main video signal during a next 50 μs interval, then in a next 1 μs interval synchronizing the write operation with a read-out operation.

* * * * *